United States Patent [19]
Halladay

[11] Patent Number: 6,160,043
[45] Date of Patent: Dec. 12, 2000

[54] CURABLE COMPOSITIONS HAVING HIGH AMOUNT OF ANTIOZONANT AND AN ARTICLE MADE THEREFROM

[75] Inventor: James R. Halladay, Harborcreek, Pa.

[73] Assignee: Lord Corporation, Cary, N.C.

[21] Appl. No.: 08/869,519

[22] Filed: Jun. 5, 1997

[51] Int. Cl.[7] .................................. C08L 5/48; C08L 5/34
[52] U.S. Cl. ............................................. 524/91; 524/100
[58] Field of Search ....................................... 524/91, 100

[56] References Cited

U.S. PATENT DOCUMENTS

| | | | |
|---|---|---|---|
| 2,877,189 | 3/1959 | Olin | 252/401 |
| 3,163,616 | 12/1964 | Stahly | 260/28.5 |
| 3,419,639 | 12/1968 | Gentile | 260/889 |
| 3,502,612 | 3/1970 | Latos | 260/45.8 |
| 3,502,615 | 3/1970 | Rosenwald | 260/45.9 |
| 3,634,313 | 1/1972 | Sullivan et al. | 260/45.8 |
| 3,928,344 | 12/1975 | Westlinning et al. | 260/249.5 |
| 3,982,975 | 9/1976 | Elrick et al. | 149/19.9 |
| 4,257,468 | 3/1981 | Ogawa et al. | 152/209 R |
| 4,297,269 | 10/1981 | Merten et al. | 260/45.9 QB |
| 4,559,378 | 12/1985 | Kay et al. | 524/45.9 QB |
| 4,767,809 | 8/1988 | Wingrove | 524/255 |
| 4,794,034 | 12/1988 | Wheeler et al. | 524/100 |
| 4,794,135 | 12/1988 | Wheeler et al. | 524/100 |
| 4,855,346 | 8/1989 | Battey et al. | 524/217 |
| 4,893,988 | 1/1990 | Sato | 416/140 |
| 4,918,124 | 4/1990 | Eichenauer et al. | 524/151 |
| 4,946,881 | 8/1990 | Cornell et al. | 524/100 |
| 5,023,287 | 6/1991 | Evans et al. | 524/255 |
| 5,344,861 | 9/1994 | Nakamura et al. | 524/254 |
| 5,449,152 | 9/1995 | Byrnes et al. | 267/153 |

FOREIGN PATENT DOCUMENTS

| | | | |
|---|---|---|---|
| 748497 | 12/1966 | Canada | 400/96 |
| 1172596 | 3/1967 | United Kingdom | C08C 11/46 |
| WO 94/00513 | 1/1994 | WIPO . | |

OTHER PUBLICATIONS

Morton; "Rubber Technology"; 1973; Second Edition; pp. 44–45.

Walker, et al.; "Antidegradants for Ozone and Fatigue Resistance: Laboratory & Fire Tests"; May 1980; pp. 36–37.

*Primary Examiner*—Peter D. Mulcahy
*Attorney, Agent, or Firm*—Wayne W. Rupert

[57] ABSTRACT

A composition that includes (a) at least one elastomer; (b) at least one curing agent; and (c) at least 15 parts (per hundred parts by weight of the elastomer) of an antiozonant package that includes at least two antiozonants that are each selected from different antiozonant classes wherein the antiozonant classes are dialkyl p-phenylenediamine, N-alkyl N-aryl phenylenediamine and 2,4,6-tris(N-alkyl-p-phenylenediamino)-1,3,5 triazine. The composition is useful to make a shear element for use in a damper or a load element for use in a mount.

10 Claims, 2 Drawing Sheets

CURABLE COMPOSITIONS HAVING HIGH AMOUNT OF ANTIOZONANT AND AN ARTICLE MADE THEREFROM

BACKGROUND OF THE INVENTION

The present invention relates to a composition that includes an elastomer and antiozonants.

Ethylenically unsaturated elastomer compositions are particularly susceptible to ozone attack. It is known that ozone degradation will lead to cracks in articles of manufacture made from the cured composition, especially if the articles are subjected to dynamic conditions such as flexing during use.

The use of antioxidants in elastomer compositions to counter this degradation is well known. However, it is a widely held view in the elastomer formulation art that the conventional amount of antiozonant should be less than approximately 5 or 6 parts per hundred parts rubber (phr). See, for example, Morton (ed.), "Rubber Technology", p. 44 (2d ed. 1973); U.S. Pat. Nos. 5,023,287; 4,855,346; 4,559, 378; 4,297,269; 4,257,468; 3,502,612; and 3,419,639; and Great Britain Published Patent Specification No. 1,172,596. Indeed, U.S. Pat. No. 5,023,287 states that "[i]t is not possible to simply incorporate higher levels of anti-degradants into the rubber compound without detrimentally impacting its physical properties. Further, high levels of free antiozonant only increases the initial surface concentration above the level required for effective protection without significantly extending the time prior to failure." U.S. Pat. No. 5,023,287 also includes evidence demonstrating that "at the 8.0 phr level, the [antiozonant] compound appears to be pro-degradative and thus fails sooner than the 6.0 and 4.0 phr levels." U.S. Pat. No. 4,257,468 states that "when the amount [of the antiozonant] exceeds 5 parts by weight, the tear strength of the vulcanizate becomes low and consequently the chipping phenomenon is apt to occur."

There are a few Patents (U.S. Pat. Nos. 5,344,861; 4,794, 135; 4,767,809; 3,928,344; 3,634,313 and 3,163,616 and Canadian Patent No. 748,497) that mention that up to 10 phr of antiozonant might possibly be used, but none of these Patents appear to include a specific example that includes 10 phr of antiozonant.

U.S. Pat. No. 2,877,189 describes mixing 100 g of antioxidant powder with 400 g of GR-S rubber stock and mixing 310 grams of natural rubber stock with 50 grams of antioxidant powder. Various p-phenylenediamines were used as antioxidant powders. However, these compositions were included solely for the purpose of providing a comparative example that demonstrates that the invention claimed in the '189 patent was a superior method for incorporating antioxidant into a rubber stock. There is no indication that the GR-S stock/antioxidant mixture or natural rubber stock/antioxidant mixture included a curing or vulcanizing agent or were vulcanized or cured into an article of manufacture.

SUMMARY OF THE INVENTION

It has now been found quite unexpectedly that articles made from ethylenically unsaturated elastomers are exposed to much higher than normal concentrations of atmospheric ozone when these articles are passed through the atmosphere at very high air speed. This problem is particularly prevalent in an elastomeric article that is used in helicopter rotor head assemblies due to the rotor head velocity through the atmosphere. In effect, the assembly acts as an ozone filter in the atmosphere.

According to the present invention it has been unexpectedly found that by employing certain mixtures of antiozonants the amount of antiozonant in an elastomer-containing composition can be increased to levels higher than previously thought without degrading the properties of the composition. Even more surprising is that these combinations and higher levels actually result in a substantial increase in ozone resistance. Consequently, the elastomer-containing composition can be used to make an article that solves the high velocity-ozone problem.

In one aspect the present invention is a composition that includes (a) at least one elastomer; (b) at least one curing agent; and (c) at least 15 parts (per hundred parts by weight of the elastomer) of an antiozonant package that includes at least two antiozonants that are each selected from different antiozonant classes wherein the antiozonant classes are dialkyl p-phenylenediamine, N-alkyl N-aryl p-phenylenediamine and 2,4,6-tris(N-alkyl-p-phenylenediamino)-1,3,5 triazine.

Another aspect of the present invention is a damper that includes an inner member, an outer member and a cured elastomeric element bonded to and between the inner member and the outer member wherein the cured elastomeric element is made by curing and molding a curable composition that includes (a) at least one heat-vulcanizable elastomer; (b) at least one curing agent; and (c) at least 15 parts (per hundred parts by weight of the elastomer) of an antiozonant package that includes at least two antiozonants that are each selected from different antiozonant classes wherein the antiozonant classes are dialkyl p-phenylenediamine, N-alkyl N-aryl p-phenylenediamine and 2,4,6-tris(N-alkyl-p-phenylenediamino)-3,5 triazine.

BRIEF DESCRIPTION OF THE DRAWINGS

The preferred embodiments of the invention will be described in more detail below with reference to the following drawings wherein.

DETAILED DESCRIPTION OF THE PREFERRED EMBODIMENTS

Figure 1:
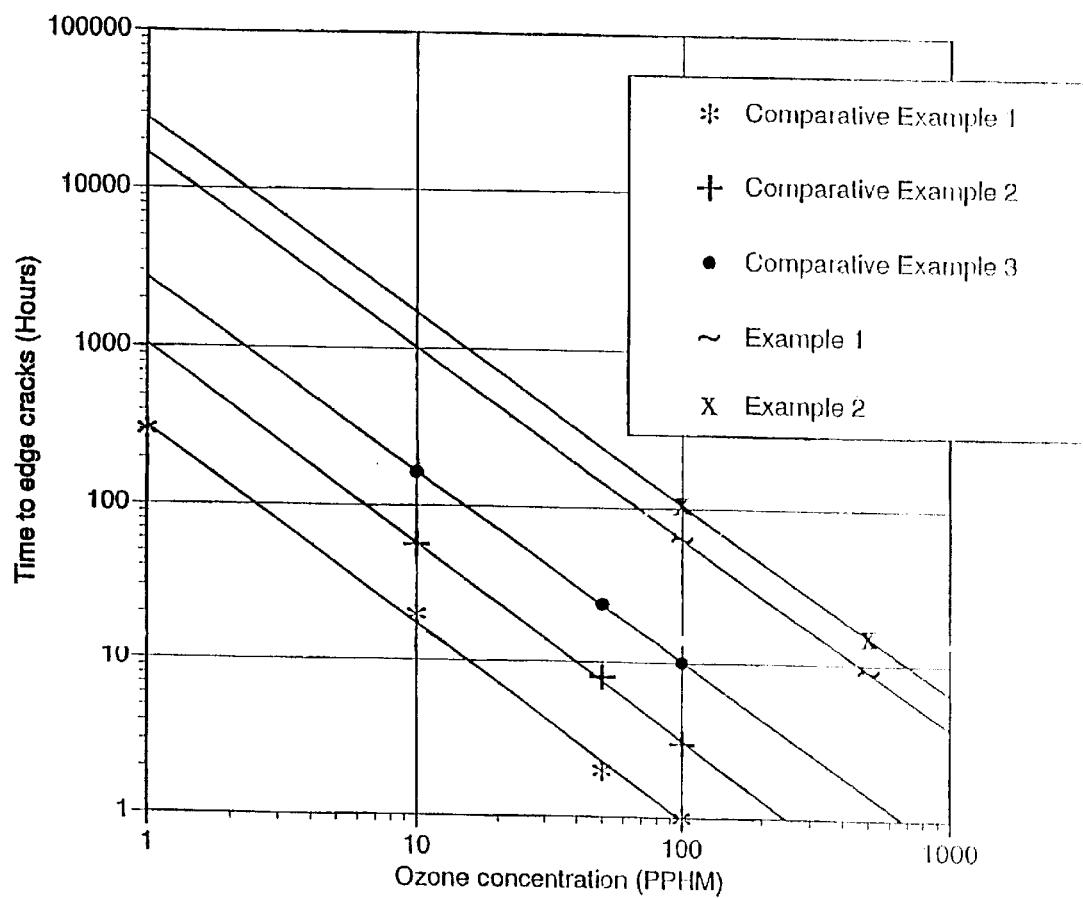
FIG. 1 is a graph demonstrating the superior ozone resistance of the inventive composition relative to comparative compositions.

As used herein, "curable composition" and "composition" is distinguished from, and does not include, a masterbatch composition. The curable composition of the invention can be cured and formed into an end use article without further mixing of other components. A masterbatch composition, on the other hand, is mixed with a rubber or elastomer base or stock composition resulting in a composition that can then be cured and formed into an end use article.

The antiozonants are present in the composition of the invention in a total amount of at least 15, preferably at least 20, and most preferably at least 22, parts per hundred by weight of the elastomer. As discussed above, these amounts are significantly greater than the highest amounts of antiozonants previously recognized as being useful in elastomer compositions. Contrary to the belief in the art, it has been found that ozone resistance of the cured elastomer composition is significantly increased with the high amount antiozonant mixture of the invention. Moreover, this increase in ozone resistance is achieved without sacrificing other properties and characteristics of the elastomer composition such as tensile strength, elongation, tear strength, compression set, heat aging and dynamic properties.

The high amount of antiozonants can be achieved by employing a certain mixture of antiozonants. The antiozonant package of the invention includes at least two antiozonants each selected from a different class of antiozonants. The classes of antiozonants useful in the invention are dialkyl p-phenylenediamine, N-alkyl N-aryl p-phenylenediamine and 2,4,6-tris(N-alkyl-p-phenylenediamino)-1,3,5 triazine. In other words, the antiozonant package includes at least a dialkyl p-phenylenediamine antiozonant and a N-alkyl N-aryl p-phenylenediamine antiozonant; or a dialkyl p-phenylenediamine antiozonant and a 2,4,6-tris(N-alkyl-p-phenylenediamino)-1,3,5 triazine antiozonant; or a N-alkyl N-aryl p-phenylenediamine antiozonant and a 2,4,6-tris(N-alkyl-p-phenylenediamino)- 1,3,5 triazine antiozonant. Preferably, the antiozonant package includes at least three antiozonants each selected from a different class. In other words, the antiozonant pack includes at least one dialkyl p-phenylenediamine, at least one N-alkyl N-aryl p-phenylenediamine and at least one 2,4,6-tris(N-alkyl-p-phenylenediamino)-1,3,5 triazine.

Illustrative suitable dialkyl p-phenylenediamine antiozonants include N,N'-bis (methylheptyl)-p-phenylenediamine, N,N'-bis(1,4-dimethylpentyl)-p-phenylenediamine N,N'-bis (1-ethyl-3-methylpentyl)-p-phenylenediamine, N,N'-bis (1-cyclohexyl-1-ethyl)-p-phenylenediamine, N,N'-diisopropyl-p-phenylenediamine and N,N'-di-sec-butyl-p-phenylenediamine.

Illustrative suitable N-alkyl N-aryl p-phenylenediamine antiozonants include N-isopropyl-N'-phenyl-p-phenylene diamine, N-cyclohexyl-N'-phenyl-p-phenylenediamine, N-methylpentyl-N'phenyl-p-phenylenediamine, N-dimethylbutyl-N'-phenyl-p-phenylenediamine N-phenyl-N'-(1,4-dimethylpentyl)-p-phenylenediamine, N-phenyl-N'-(1-methylheptyl)-p-phenylenediamine, N-sec-butyl-N'-phenyl-p-phenylenediamine and N-octyl-N'-phenyl-p-phenylenediamine.

Illustrative suitable 2,4,6-tris(N-alkyl-p-phenylenediamino)-1,3,5 triazine antiozonants include those described in U.S. Pat. No. 4,794,135. According to this patent, the preferred alkyl groups are branched $C_3$–$C_{18}$ alkyl groups, the more preferred alkyl groups are cycloalkyls or $C_1$–$C_2$ alkyl-substituted cycloalkyls, and the most preferred alkyl groups are $C_6$-$C_8$ branched chain alkyl groups. Examples include 2,4,6-tris (N-1,4-dimethylpentyl-p-phenylenediamino)-1,3,5-triazine, 2,4,6-tris(N-isopropyl-p-phenylenediamino)-1,3,5-triazine 2,4,6-tris(N-cyclohexyl-p-phenylenediamino)-1,3,5-triazine 2,4,6-tris(N-sec-butyl-p-phenylenediamino)-1,3,5-triazine, 2,4,6-tris(N-1,3-dimethylbutyl-p-phenylenediamino)-1,3,5-triazine, 2,4,6-tris(N-1-methylheptyl-p-phenylenediamino)-1,3,5-triazine, 2,4,6-tris(N-2,4-di-tert-butylcyclohexyl-p-phenylenediamino)-1,3,5-triazine, and 2,4,6-tris(N-2-sec-butylcyclohexyl-p-phenylenediamino)-1,3,5-triazine.

The amounts of the individual antiozonants may vary provided the total amount of all the antiozonants present is at least 15 parts per hundred by weight of the elastomer. Preferably, the ratio of the amount of the dialkyl p-phenylenediamine antiozonant to the N-alkyl N-aryl p-phenylenediamine antiozonant is 1:2 to 2:1, with 1:1 being most preferred. It is also preferable that the amount of the 2,4,6-tris(N-alkyl-p-phenylenediamino)-1,3,5 triazine antiozonant is between 3 and 6 parts per hundred of the elastomer.

It should be recognized that microcrystalline waxes that are also used for ozone protection are not considered to form part of the antiozonant package of the invention. However, such waxes may be present in the composition in addition to the antiozonant package.

The elastomer with which the antiozonant package is useful can be any natural or synthetic elastomeric polymer that has a carbon-carbon backbone and is capable of being vulcanized (in other words, crosslinked or cured) when subjected to elevated temperatures. Such synthetic elastomers typically are prepared from organic monomers containing conjugated double or triple bonds in a manner that ensures that the resulting elastomer contains sites of unsaturation available for crosslinking or vulcanizing. Heat-vulcanizable elastomers that contain a high amount of unsaturation are particularly susceptible to ozone degradation and, thus, are particularly suited to use with the antiozonant package.

Representative heat-vulcanizable elastomers include natural rubber, polyisoprene, polybutadiene, poly(styrene-butadiene), polychloroprene, and poly(acrylonitrile-butadiene). Mixtures of heat-vulcanizable elastomers may also be used. The preferred heat-vulcanizable elastomers are natural rubber, polybutadiene and mixtures of natural rubber and polybutadiene.

Any cure system that is typically used with the previously described heat-vulcanizable elastomers is suitable for the invention. Illustrative cure systems include at least one curing agent such as sulfur, a sulfur donor compound or an organic peroxide.

Sulfur donor compounds such as disulfides that may be employed in conjunction with or in the alternative to sulfur are well known. Representative sulfur donor compounds include 2-(4-morpholinyldithio)benzothiazole, tetramethylthiuram disulfide, tetraethylthiuram disulfide, dipentamethylene thiuram hexasulfide, N,N'-caprolactam disulfide and the like.

Sulfur cure accelerators may be employed with sulfur or sulfur donor compounds. Illustrative sulfur cure accelerators include thioureas such as N,N'-dibutylthiourea, 2-mercaptoimidazoline, tetramethylthiourea and the like; guanidine derivatives such as N,N'-diphenylguanidine and the like; xanthates such as zinc dibutylxanthate and the like; dithiocarbamates such as zinc dimethyldithiocarbamate, zinc diethyldithiocarbamate and the like; thiuramsulfides such as dipentamethylenethiuram disulfide, dipentamethylenethiuram hexasulfide, tetrabutylthiuram monosulfide, tetramethylthiuram monosulfide, tetraethylthiuram monosulfide, tetraethylthiuram disulfide and the like; heterocyclics such as mercaptobenzimidazole, mercaptobenzothiazole, 2,2'-dibenzothiazyl disulfide, zinc 2-mercaptobenzothiazole and the like; and sulfenamides such as N-oxydiethylene-2-benzothiazolesulfenamide, N-t-butylbenzothaizylsulfenamide, N-cyclohexyl-2-benzothiazylsulfenamide, N,N'-diisopropyl-2-benzothaizylsulfenamide and the like.

Illustrative peroxides include benzoyl peroxide, 1,3-bis(t-butylperoxyisopropyl)benzene, butyl 4,4-bis(t-butylperoxy) valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butylperoxyhex-3-yne, 4-methyl-2,2-di-t-butyl-peroxypentane and the like.

The curing agent(s) may be present in any amount sufficient to effect curing of the elastomer. For sulfur cure systems, 0 to 3 parts by weight sulfur and 0.5 to 4 parts by weight sulfur donor compound or sulfur cure accelerator is the typical amount. For peroxide cure systems, 1 to 5 parts by weight organic peroxide is the typical amount.

The composition of the invention may also include known elastomer or rubber composition additives such as pigments, fillers, plasticizers, expanding agents, antioxidants and retarding agents.

The components of the composition of the invention are mixed and vulcanized or cured according to standard procedures in the art.

In order to demonstrate the surprising ozone resistance of the composition of the invention examples of the invention and comparative examples were prepared having the following formulations (amounts shown are in parts by weight):

| Ingredient | Example 1 | Example 2 | Comparative Example 1 | Comparative Example 2 | Comparative Example 3 |
|---|---|---|---|---|---|
| cis-polybutadiene rubber | 100.00 | 100.00 | 100.00 | 100.00 | 100.00 |
| carbon black | 80.00 | 80.00 | 85.00 | 80.00 | 80.00 |
| naphthenic process oil | 8.00 | 0 | 18.00 | 16.00 | 15.00 |
| FLEXZONE 4L[1] | 10.00 | 10.00 | 0 | 2.00 | 3.00 |
| FLEXZONE 11L[2] | 0 | 10.00 | 0 | 0 | 0 |
| DURAZONE 37 flake[3] | 5.00 | 3.50 | 3.50 | 4.00 | 4.00 |
| FLEXZONE 3C[4] | 1.50 | 1.50 | 1.50 | 0 | 0 |
| SANTOFLEX 13[5] | 3.00 | 0 | 0 | 2.00 | 3.00 |
| zinc oxide | 5.00 | 5.00 | 5.00 | 5.00 | 5.00 |
| stearic acid | 1.00 | 1.00 | 1.00 | 1.00 | 1.00 |
| cure system[6] | 3.50 | 3.50 | 3.50 | 3.50 | 3.50 |

[1]N,N'-bis(1,4-dimethylpentyl)-p-phenylenediamine available from Uniroyal Chemical
[2]N-alkyl N-aryl p-phenylenediamine blend available from Uniroyal Chemical
[3]2,4,6-tris(N-1,4-dimethylpentyl-p-phenylenediamino)-1,3,5-triazine available from Uniroyal Chemical
[4]N-isopropyl-N'-phenyl-p-phenylenediamine available from Uniroyal Chemical
[5]N-1,3-dimethylbutyl-N'-phenyl-p-phenylenediamine available from Monsanto
[6]A mixture of sulfur and sulfenamide The ingredient mixture was cured at 307° F. (153° C.) for 10 minutes to form a standard 6 inch (15.2 cm)×6 inch (15.2 cm)×0.075 inch (0.19 cm) ASTM tensile pad. Strips of 2 inch (5.1 cm)×0.25 inch (0.63 cm)×0.075 inch (0.19 cm) were cut from the pad. Dynamic ozone testing was performed on these strips. The strips were mounted in a motor-driven eccentric cam assembly machine designed to strain the specimens from 0 to 100% tensile strain at a frequency of 1 hertz. The entire apparatus (test machine and mounted specimens) was placed in an ozone chamber where the temperature was maintained at 104° F. (40° C.) and the amount of ozone was maintained at a constant for various levels of ozone. Time to edge cracking of the specimens was measured as the time it required for tiny cracks to appear under 4×magnification in the right angle region of the specimen. The results are shown in the graph of FIG. 1. It is clear from this graph that there is an order of magnitude improvement in ozone resistance with the composition of the present invention relative to the comparative examples.

In order to confirm that the high amount of antiozonant of the inventive composition did not detract from any of the properties of the composition the following formulations were prepared and cured:

| Ingredient | Comparative Example 4 | Example 3 |
|---|---|---|
| cis polybutadiene rubber | 100.00 | 100.00 |
| carbon black | 85.00 | 80.00 |
| naphthenic process oil | 18.00 | 0 |
| FLEXZONE 4L | 0 | 10.00 |
| FLEXZONE 11L | 0 | 10.00 |
| DURAZONE 37 flake | 3.50 | 5.00 |
| FLEXZONE 3C | 1.50 | 1.50 |
| zinc oxide | 5.00 | 5.00 |
| stearic acid | 1.00 | 1.00 |
| cure system | 3.50 | 3.50 |

The following properties were measured from specimens having these formulations:

| PROPERTIES | Comparative Example 4 | Example 3 |
|---|---|---|
| Hardness (Shore A pts)[1] | 60 | 58 |
| Tensile (psi)[2] | 1965 | 2036 |
| Elongation (%)[2] | 690 | 704 |
| 100% modulus[2] | 215 | 188 |
| Tear die C (PPI)[3] | 269 | 386 |
| Compression set[4] 70 hrs. at 212° F. (100° C.) | 40.7 | 43.5 |
| Oven age 168 hrs. at 212° F. (100° C.)[4] | | |
| Hardness (Shore A pts)[1] | 77 | 79 |
| Tensile (psi)[2] | 1915 | 1820 |
| Elongation (%)2 | 355 | 490 |
| Δhardness (Shore A pts) | 17 | 21 |
| Δtensile (%) | −2.5 | −10.6 |
| Δelongation (%) | −48.6 | −30.4 |

[1]ASTM D2240
[2]ASTM D412
[3]ASTM D624
[4]ASTM D573 air oven method
[5]ASTM D396 method B The elastomer-containing composition of the invention is useful in any device or article of manufacture such as a damper, isolator or mount that is subjected to high dynamic strain (for example, greater than 20%) and a high velocity stream of ozone-containing air. The composition is particularly useful to make a shear element in a damper that is used in helicopter rotor blade retention systems. Such dampers are especially subjected to high dynamic strain and pass through the ozone-containing atmosphere. Illustrative dampers include lead-lag dampers as shown in U.S. Pat. Nos. 3,758,230; 3,842,945; 4,028,002; 4,893,988; 5,374,039; 5,449,152 and 5,501,434, all incorporated herein by reference. A composite example of a damper in which the elastomer-containing composition of the invention is particularly useful is depicted in FIG. 2.

Figure 2:
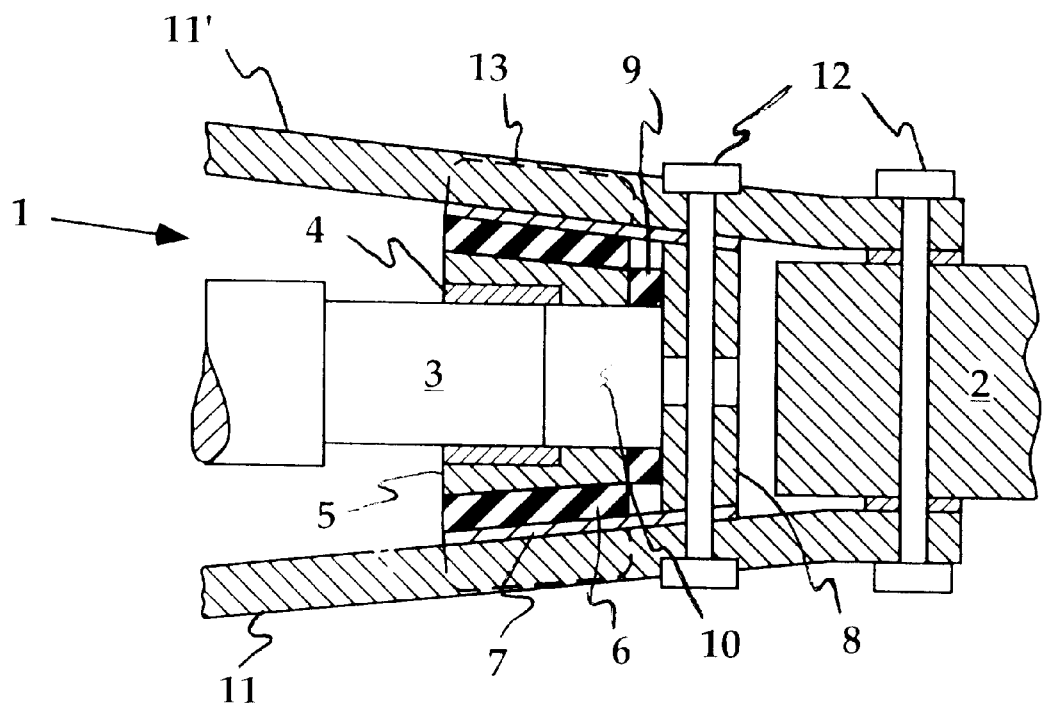
FIG. 2 is a cross-sectional view of an exemplary damper that includes an elastomeric element made from the composition of the invention.

The damper of FIG. 2 is a lead-lag damper 1 that is disposed between a helicopter rotor hub (not shown) and a rotor blade 2. An inboard end of a pilot 3 is attached to the rotor hub by conventional means (not shown) and an outboard end of the pilot 3 is aligned within a receiving cavity 10 located at the inboard end of the damper 1. The pilot 3 is connected to the damper 1 via a bushing 4. The bushing 4 is disposed in a recess in an inner member 5 of the damper 1 and allows or slidable movement of the pilot 3 within the receiving cavity 10. A first elastomeric element 6 is positioned between the inner member 5 and an outer member 7 of the damper 1 and acts to dissipate the energy generated by the shear strain caused by the relative displacement of the inner member 5 to the outer member 7 as the rotor blade 2 rotates during use. The first elastomeric element 6 is made from the elastomer-containing composition of the invention. The inner member 5 and outer member 7 are typically made from metal. The first elastomeric element 6 is adhesively bonded to a facing surface of the inner member 5 and an opposing facing surface of the outer member 7.

The damper 1 also includes a spacer 8 that forms the outboard end of the damper 1 and is positioned adjacent to a portion of the outer member 7. A second elastomeric element 9 is disposed between the spacer 8 and the outboard end of the inner member 5. The second elastomeric element 9 is made from the elastomer-containing composition of the invention. The spacer 8 is typically made from metal. The second elastomeric element 9 is adhesively bonded to a portion of the inboard surface of the spacer 8 and the surface of the outboard end of inner member 5. The second elastomeric element 9 is shown in FIG. 2 as a distinct piece separate from the first elastomeric element 6, but it could be contiguous with the first elastomeric element 6.

A cuff 11 and 11' extends over and couples the rotor hub to the rotor blade 2. The cuff 11 and 11' also extends over the damper 1 to provide a platform for securing the damper 1 into place. The cuff 11 and 11' can be fastened to the damper 1 and the rotor blade 2 by any means such as, for example, the bolts 12 and flanges 13 shown in FIG. 2.

Figure 3:
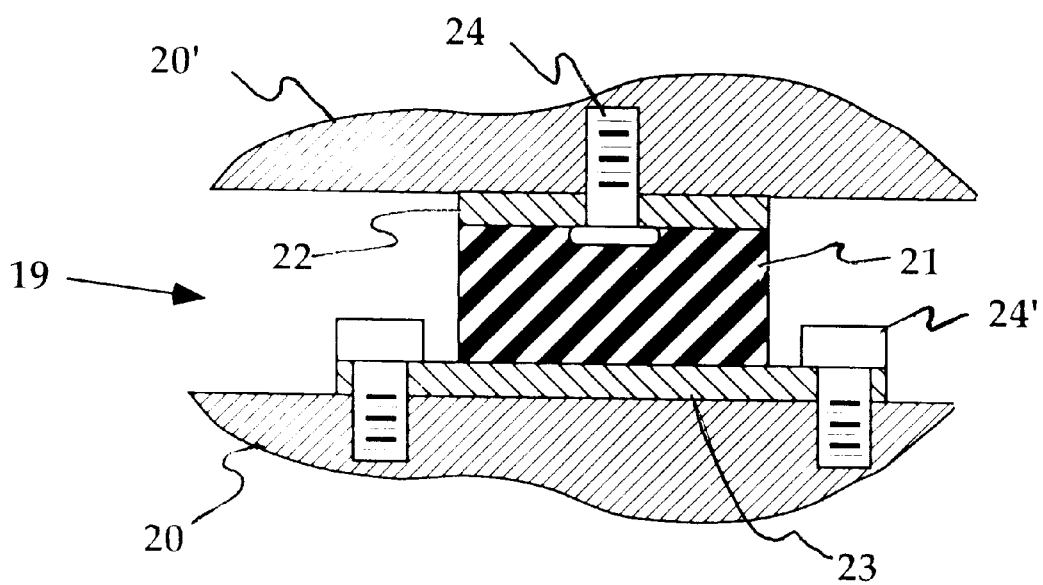
FIG. 3 is a cross-sectional view of an exemplary mount that includes an elastomeric member made from the composition of the invention.

An example of a mount 19 between two bodies 20 and 20' is shown in FIG. 3. An elastomeric member 21 is disposed between a first plate 22 and a second plate 23. The elastomeric member 21 is made from the elastomer-containing composition of the invention and is adhesively bonded to the opposing surfaces of the first 22 and second 23 plates. The first 22 and second 23 plates can be fastened to the bodies 20 via any means such as, for example, the bolts 24 and 24' depicted in FIG. 3.

What is claimed is:

1. A composition comprising:
   (a) at least one elastomer;
   (b) at least one curing agent; and
   (c) at least 15 parts (per hundred parts by weight of the elastomer) of an antiozonant package that includes at least two antiozonants that are each selected from different antiozonant classes wherein the antiozonant classes are dialkyl p-phenylenediamine, N-alkyl N-aryl p-phenylenediamine and 2,4,6-tris(N-alkyl-p-phenylenediamino)-1,3,5 triazine.

2. A composition according to claim 1 wherein the antiozonant is present in an amount of at least 15 parts (per hundred parts by weight of the elastomer).

3. A composition according to claim 1 wherein the antiozonant is present in an amount of at least 20 parts (per hundred parts by weight of the elastomer).

4. A composition according to claim 1 wherein the antiozonant package includes at least three antiozonants that are each selected from each of the different antiozonant classes.

5. A composition according to claim 1 wherein the weight ratio of the dialkyl p-phenylenediamine to the N-alkyl N-aryl p-phenylenediamine ranges from 1:2 to 2:1.

6. A composition according to claim 1 wherein the 2,4,6-tris(N-alkyl-p-phenylenediamino)-1,3,5 triazine is present in an amount of 3 to 6 parts (per hundred parts by weight of the elastomer).

7. A composition according to claim 4 wherein the dialkyl p-phenylenediamine is N,N'-bis(1,4-dimethylpentyl)-p-phenylenediamine, the N-alkyl N-aryl p-phenylenediamine is selected from the group consisting of N-isopropyl-N'-phenyl-p-phenylenediamine and N-1,3-dimethylbutyl-N'-phenyl-p-phenylenediamine and the 2,4,6-tris(N-alkyl-p-phenylenediamino)-1,3,5 triazine is 2,4,6-tris(N-1,4-dimethylpentyl-p-phenylenediamino)-1,3,5-triazine.

8. A composition according to claim 1 wherein the elastomer is selected from at least one of the group consisting of natural rubber, polyisoprene, polybutadiene, poly(styrene-butadiene), polychloroprene and poly(acrylonitrile-butadiene).

9. A composition according to claim 1 wherein the composition is a curable composition and the elastomer is a heat-vulcanizable elastomer.

10. A composition according to claim 9 wherein the composition is cured.

\* \* \* \* \*